US006904296B2

(12) United States Patent
Geeraert et al.

(10) Patent No.: US 6,904,296 B2
(45) Date of Patent: Jun. 7, 2005

(54) INTERNAL ANTENNA FOR MOBILE COMMUNICATIONS DEVICE

(75) Inventors: Francis Geeraert, Deinze (BE); Hans Erik Gram, Bagsvaerd (DK)

(73) Assignee: Nokia Mobile Phones Limited, Espoo (FI)

( * ) Notice: Subject to any disclaimer, the term of this patent is extended or adjusted under 35 U.S.C. 154(b) by 394 days.

(21) Appl. No.: 09/779,854

(22) Filed: Feb. 9, 2001

(65) Prior Publication Data

US 2002/0111185 A1 Aug. 15, 2002

(51) Int. Cl.[7] .................................................. H04M 1/00

(52) U.S. Cl. ..................... 455/550.1; 455/83.4; 455/82; 455/97; 455/575.5; 455/280; 343/700 MS; 343/702

(58) Field of Search ................................ 455/550.1, 15, 455/63.4, 82, 97, 121, 124, 267, 275, 224, 575.5, 280, 13.3, 25, 83, 562.1, 575.7, 163.1; 343/700 R, 701, 702, 725, 700 MS, 846, 740, 747, 793, 765, 845

(56) References Cited

U.S. PATENT DOCUMENTS 5,614,863 A * 3/1997 Pierro et al. ................ 330/1 R
6,130,651 A * 10/2000 Yanagisawa et al. ....... 343/895
6,288,682 B1 * 9/2001 Thiel et al. ................. 343/702
6,424,300 B1 * 7/2002 Sanford et al. ............. 343/702
6,492,952 B1 * 12/2002 Hu ............................. 343/702
6,549,169 B1 * 4/2003 Matsuyoshi et al. ........ 343/702
2002/0018516 A1 * 2/2002 Mizuguchi .................. 375/130
2004/0185916 A1 * 9/2004 Chang et al. ............... 455/572

FOREIGN PATENT DOCUMENTS

WO WO 98/44588 * 10/1998 ............ H01Q/9/04

* cited by examiner

*Primary Examiner*—Nick Corsaro
*Assistant Examiner*—Shaima Q. Aminzay
(74) *Attorney, Agent, or Firm*—Antonelli, Terry, Stout & Kraus, LLP

(57) ABSTRACT

A balanced antenna is provided for a mobile telephone which couples to the outputs from a balanced power amplifier stage without needing connection through a lossy conversion circuit. The balanced antenna comprises two radiating elements positioned opposite one another with the feed points positioned so that the radiating fields from the two elements superpose. A floating ground is also provided which reduces the effects of components located on the PCB under the antenna.

18 Claims, 12 Drawing Sheets

INTERNAL ANTENNA FOR MOBILE COMMUNICATIONS DEVICE

BACKGROUND OF THE INVENTION

1. Field of the Invention

This invention relates to an internal antenna for a mobile communications device such as a mobile telephone.

BACKGROUND

2. Description of the Prior Art

It is common for the rf stage of a mobile communications device to include a balanced power amplifier stage. The main advantages of balanced power amplifiers include lower distortion and better rejection of power supply noise. Power amplifiers designed for mobile communications equipment typically have an output impedance of around 5 ohms, requiring an impedance matching network to connect to a conventional antenna which is generally designed to have a 50 ohm impedance.

SUMMARY OF THE INVENTION

According to a first aspect of the invention, there is provided a balanced antenna for connecting to a balanced power amplifier stage in a portable communications device, the balanced power amplifier stage having first and second outputs, the antenna comprising a ground plane and first and second antenna elements spaced apart from each other and from the ground plane, wherein the antenna elements are arranged to be opposite one another and each of the antenna elements has a feed point connectable to one of the outputs from the power amplifier stage.

The balanced antenna according to the invention can interface directly to a balanced power amplifier (PA) stage without the need for a lossy conversion network. When a balanced antenna is used, the printed circuit board (PCB) of the mobile communications device is not part of the antenna. By contrast, in a single ended antenna, the PCB is part of the antenna and a large portion of the radiated rf signal is emitted from the telephone's PCB. Therefore, for a balanced antenna, the antenna induced currents in the ground plane of the PCB are much smaller and less likely to cause disturbances in the telephone's electronics.

The antenna according to the invention can be tuned to impedances between about 3 to 15 ohms, so that the balanced PA stage, which typically has an output impedance of around 5 ohms, can be connected directly to the antenna without an impedance matching network.

The elements can be substantially identical and one element can be reversed with respect to the other.

The balanced antenna can include a floating ground between the ground plane and the antenna elements. Advantageously, the floating ground avoids the problem of a component mounted on the printed circuit board (PCB) under the antenna affecting the impedance to ground of the radiating element of the antenna closest to the component. It also avoids disturbance of the operation of the component by the antenna field and so can make it possible to utilize the PCB area under the antenna.

According to the invention, there is also provided a portable communications device comprising a circuit board having a plurality of electronic components mounted thereon and a balanced antenna, the balanced antenna comprising first and second substantially parallel antenna elements mounted to the board, each of the antenna elements having a top edge and a bottom edge, the bottom edge being nearer the board than the top edge, the device further comprising a ground plane disposed between the bottom edge of the antenna elements and the board, the ground plane being electrically isolated from the antenna elements and the board.

In another aspect, the invention provides a balanced antenna for a portable communications device, comprising a ground plane and first and second substantially similar antenna elements spaced from the ground plane, the first and second elements being substantially parallel to the ground plane and being aligned in opposite directions with respect to one another.

According to the invention, there is further provided a method of manufacturing a balanced antenna for connecting to a balanced power amplifier stage in a portable communications device, the balanced power amplifier stage having first and second outputs, the antenna comprising a ground plane and first and second antenna elements spaced apart from each other and from the ground plane, wherein the antenna elements are arranged to be opposite one another and to overlap to a predetermined extent, and each of the antenna elements has a feed point connectable to one of the outputs from the power amplifier stage, the method comprising varying the extent to which the antenna elements overlap to tune the antenna for use in a predetermined frequency band.

DESCRIPTION OF THE DRAWINGS

Embodiments of the invention will now be described by way of example, with reference to the accompanying drawings, in which.

DETAILED DESCRIPTION

Figure 1:
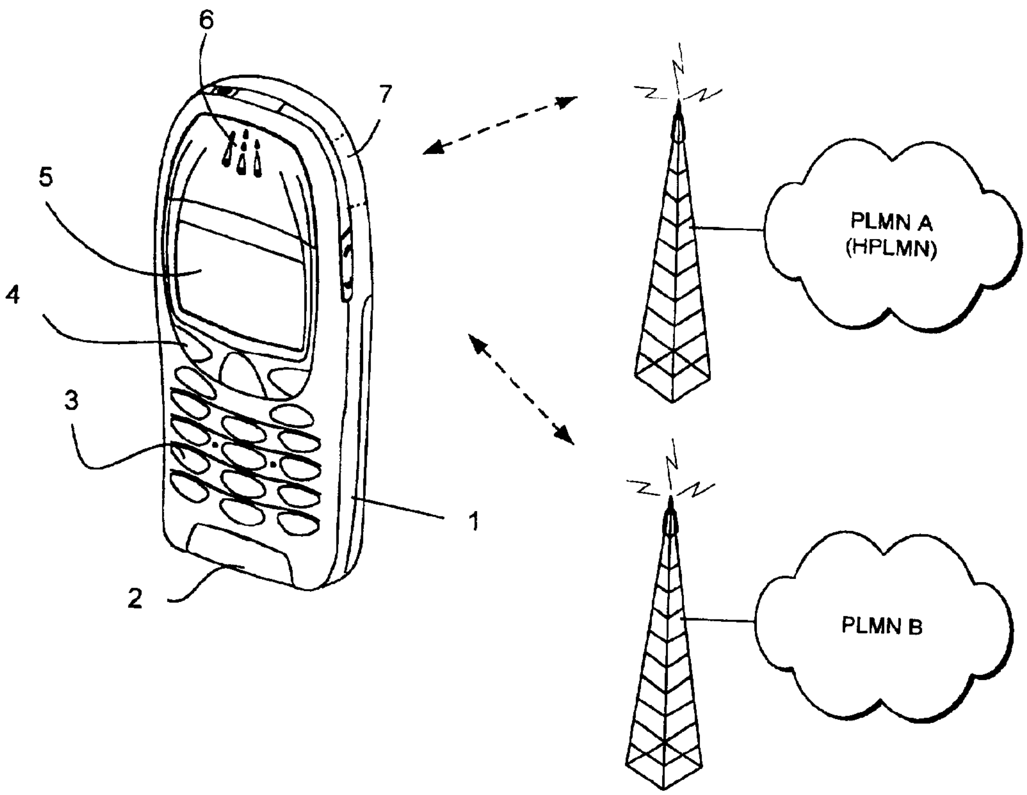
FIG. 1 is a perspective view of a mobile telephone handset.
Figure 2:
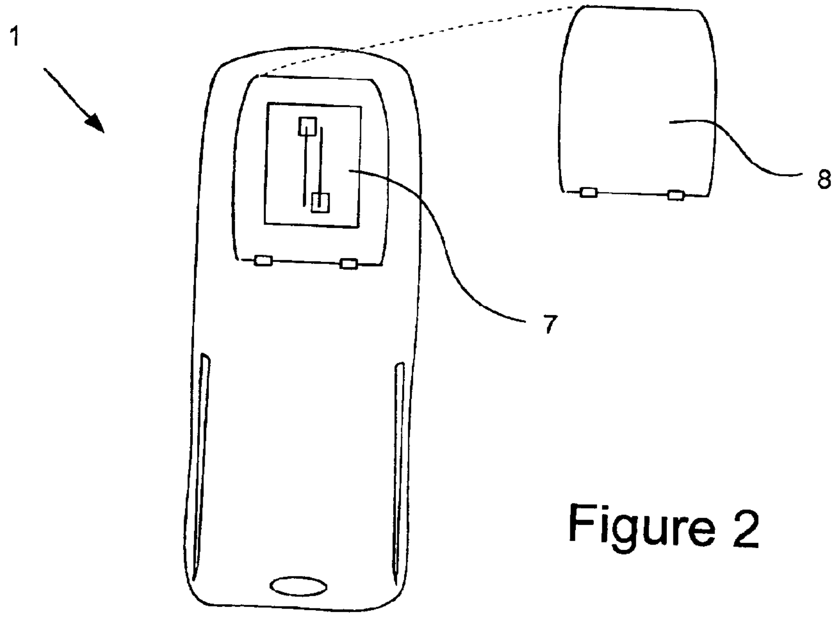
FIG. 2 is a rear view of the handset of FIG. 1.

Referring to FIG. 1, a mobile station in the form of a mobile telephone handset 1 includes a microphone 2, keypad 3, with soft keys 4 which can be programmed to perform different functions, an LCD display 5, a speaker 6 and an antenna 7 which is contained within the housing. The location of the antenna 7 is illustrated in FIG. 2, which shows the back of the handset 1 with a rear cover 8 removed.

The mobile station 1 is operable to communicate through cellular radio links with individual public land mobile networks (PLMNs), shown schematically as PLMN A and PLMN B. PLMNs A and B may utilize different frequency bands. For example, PLMN A is a GSM 1800 MHz network and PLMN B is a GSM 900 MHz network.

Generally, the handset communicates over a cellular radio link with its home network PLMN A (shown as HPLMN) in a first configuration that is using a frequency band appropriate to PLMN A. However, when the user roams to PLMN B, one of the keys on the handset, for example, one of the soft keys 4, may be operated to select a second operational configuration that is a frequency band associated with PLMNB.

Figure 3:
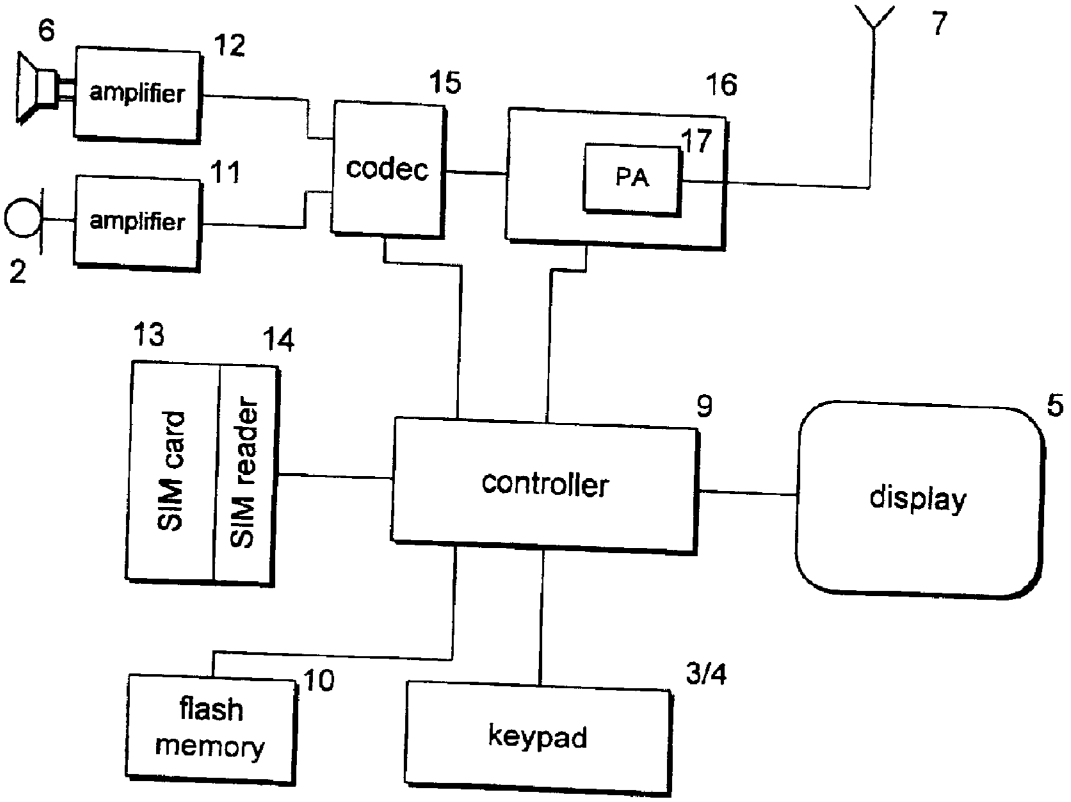
FIG. 3 is a schematic diagram of mobile telephone circuitry for use in the telephone handset of FIG. 1.

FIG. 3 illustrates the major circuit components of the telephone handset 1. Signal processing is carried out under the control of a digital microcontroller 9 which has an associated flash memory 10. Electrical analog audio signals are produced by microphone 2 and amplified by preamplifier 11. Similarly, analog audio signals are fed to the speaker 6 through an amplifier 12. The micro-controller 9 receives instruction signals from the keypad and soft keys 3, 4 and controls operation of the LCD display 5.

Information concerning the identity of the user is held on a smart card 13 in the form of a GSM SIM card which contains the usual GSM international mobile subscriber identity (IMSI) and an encryption key $K_i$, that is used for encoding the radio transmission in a manner well known per se. The SIM card is removably received in a SIM card reader 14.

The mobile telephone circuitry includes a codec 15 and an rf stage 16 including a balanced power amplifier stage 17 feeding the antenna 7. The codec 15 receives analog signals from the microphone amplifier 11, digitizes them into a GSM signal format and feeds them to the rf stage 16 for transmission through the antenna 7 to the PLMN shown in FIG. 1. Similarly, signals received from the PLMN are fed through the antenna 7 to be demodulated in the rf stage 16 and fed to codec 15, so as to produce analogue signals fed to the amplifier 12 and speaker 6.

Figure 4:
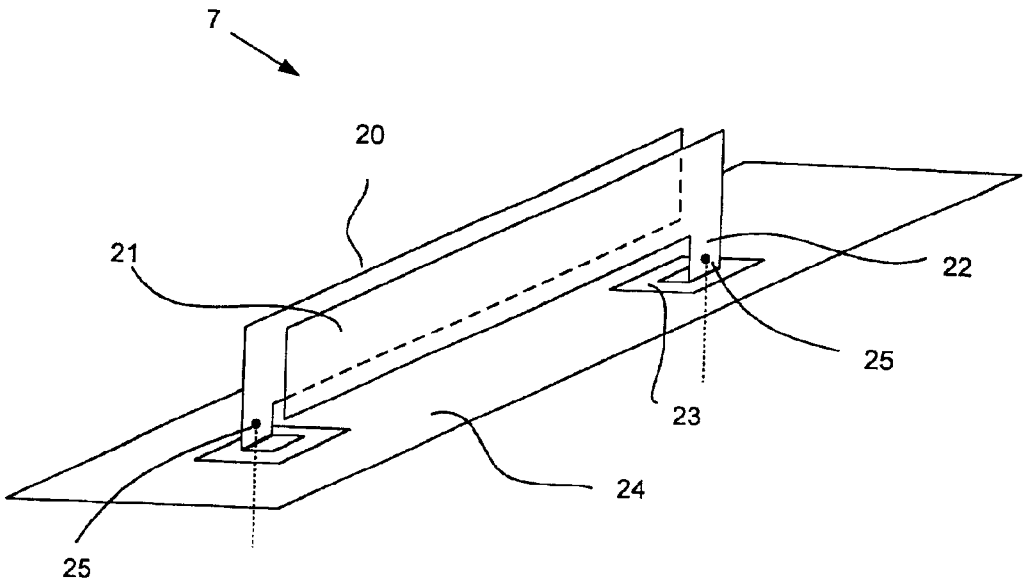
FIG. 4 shows a first arrangement of a balanced antenna in accordance with the invention.

Referring to FIG. 4, an antenna 7 according to the invention comprises a first planar conductive plate 20 spaced apart from and generally parallel to a second planar conductive plate 21. Each of the first and second conductive plates 20, 21 forms a rectangular patch antenna element 18 mm long and 3 mm wide. A conductive leg 22 extends from a bottom corner of each conductive plate 20, 21, the leg 22 resting on a non-conductive pad 23 on a third conductive plate 24 forming a ground plane, the first and second plates 20, 21 being substantially perpendicular to the third plate 24. The third conductive plate 24 is for example the printed circuit board (PCB) to the underside of which the handset components are mounted. Each antenna element 20, 21 is connected to the rf stage 16 shown in FIG. 3 via a feed point 25 located on the leg 22. The non-conductive pad 23 provides electrical isolation between the third plate 24 and the feed point 25.

The antenna could be constructed by using a "two-shot molding" (MID) technique which enables the antenna elements to be fixed in the proper positions. The MID technique provides for air between the elements and plastic on their reverse sides to fix the antenna elements. Air between the elements, where the electrical field is at a maximum, minimizes the electrical loss in the antenna. However the antenna can also be made having moldable plastic between the antenna elements and air at the reverse sides. In this case low loss plastic materials are preferably used.

Figure 5:
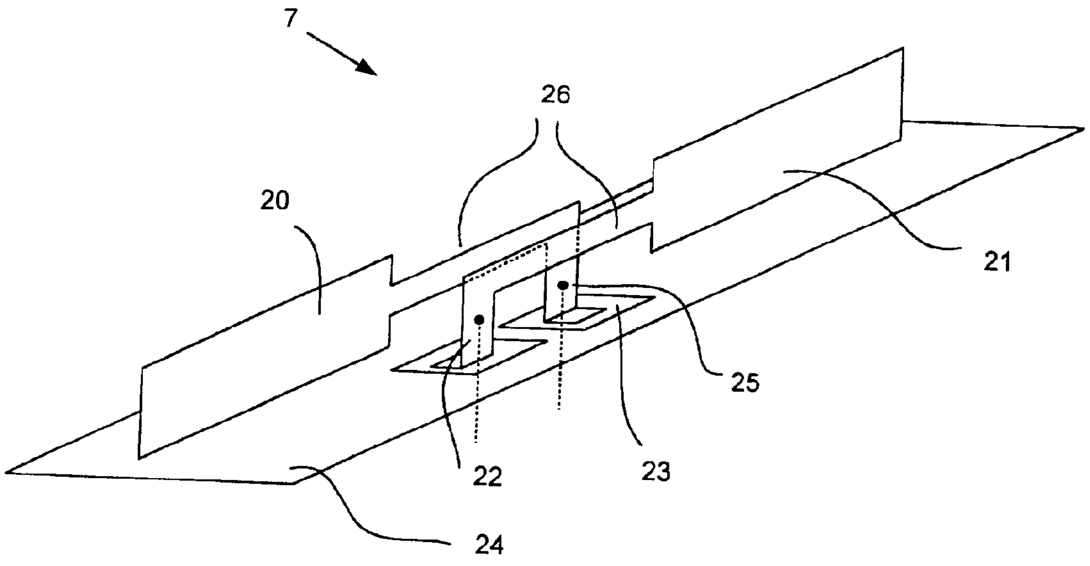
FIG. 5 shows a second arrangement of a balanced antenna in accordance with the invention.

During the development phase, the antenna 7 is tuned by changing the relative position of the two slot elements 20, 21, which changes the capacitive coupling between the elements. The inductive coupling between the elements is also controlled by displacement of the elements, as shown in FIG. 5.

FIG. 4 shows one extreme of relative position in which the elements overlap completely. This arrangement is close to that of a slot antenna. The other extreme of position (not shown) is obtained by moving the legs 22 of each of the patch elements close together so that the elements extend in opposite directions and do not overlap to any substantial extent. This arrangement is effectively a dipole antenna. FIG. 5 shows a dipole-like antenna structure where the overall arrangement is similar to FIG. 4 but in which the geometry of the plates and support structure is slightly different, so that the antenna elements 20, 21 do not overlap at all. The slot antenna elements 20, 21 are substantially rectangular elements 10 mm long by 3 mm wide, with an arm 26 1 mm wide extending from one side of each of the elements to meet the supporting leg 22 at right angles.

Of course, it is possible to tune the antenna in a variety of other ways, including changing the plate dimensions or shape or changing the distance between the elements.

Figure 6:
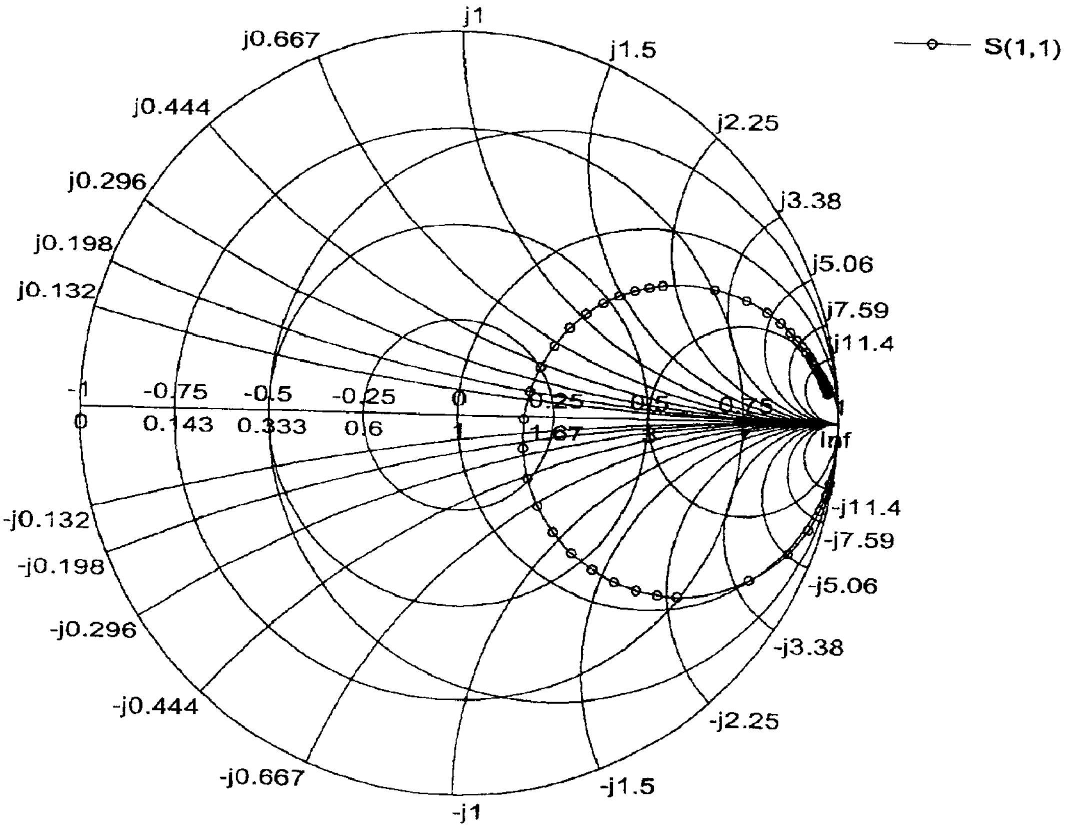
FIG. 6 shows a Smith chart for the first antenna arrangement shown in FIG. 4.
Figure 7:
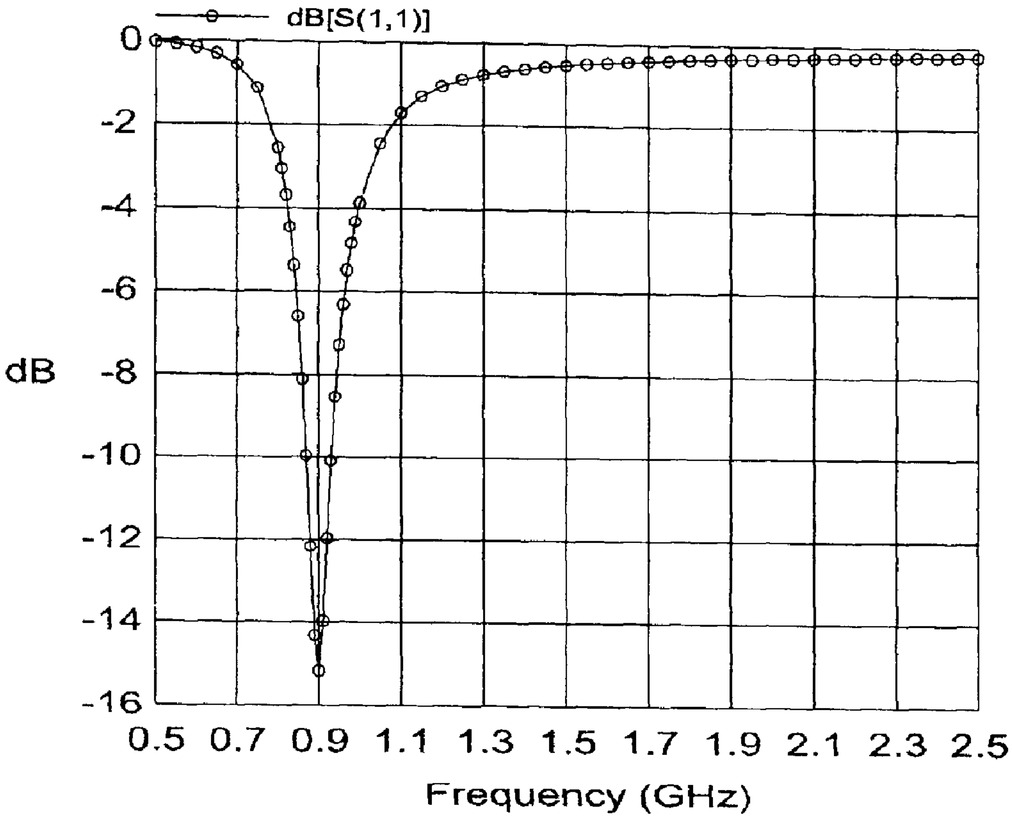
FIG. 7 shows the frequency response for the first arrangement shown in FIG. 4.

FIG. 6 shows the Smith chart for the first arrangement described above in relation to FIG. 4, while FIG. 7 illustrates the frequency response of the arrangement, showing a resonant frequency at 0.9 GHz, so that the antenna is suitable for use at the GSM 900 MHz band. The bandwidth of the antenna is approximately 12% having a return loss (S11) less than-8 dB.

Figure 8:
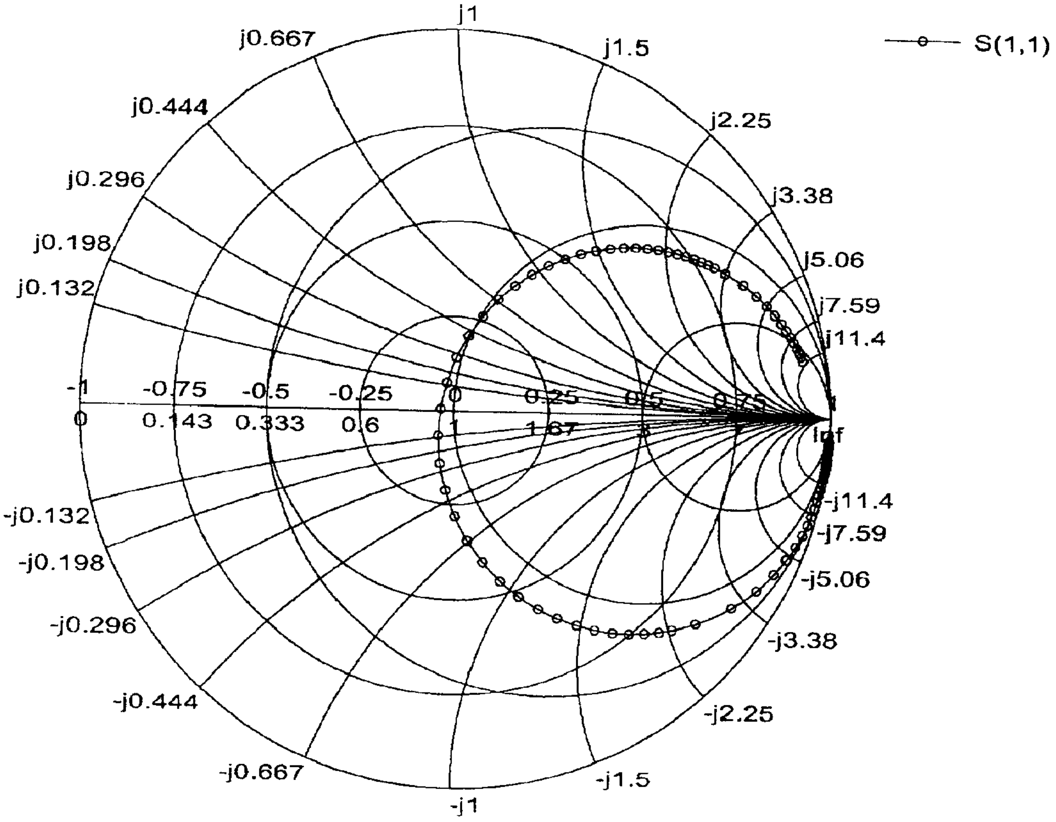
FIG. 8 shows a Smith chart for the second arrangement shown in FIG. 5.
Figure 9:
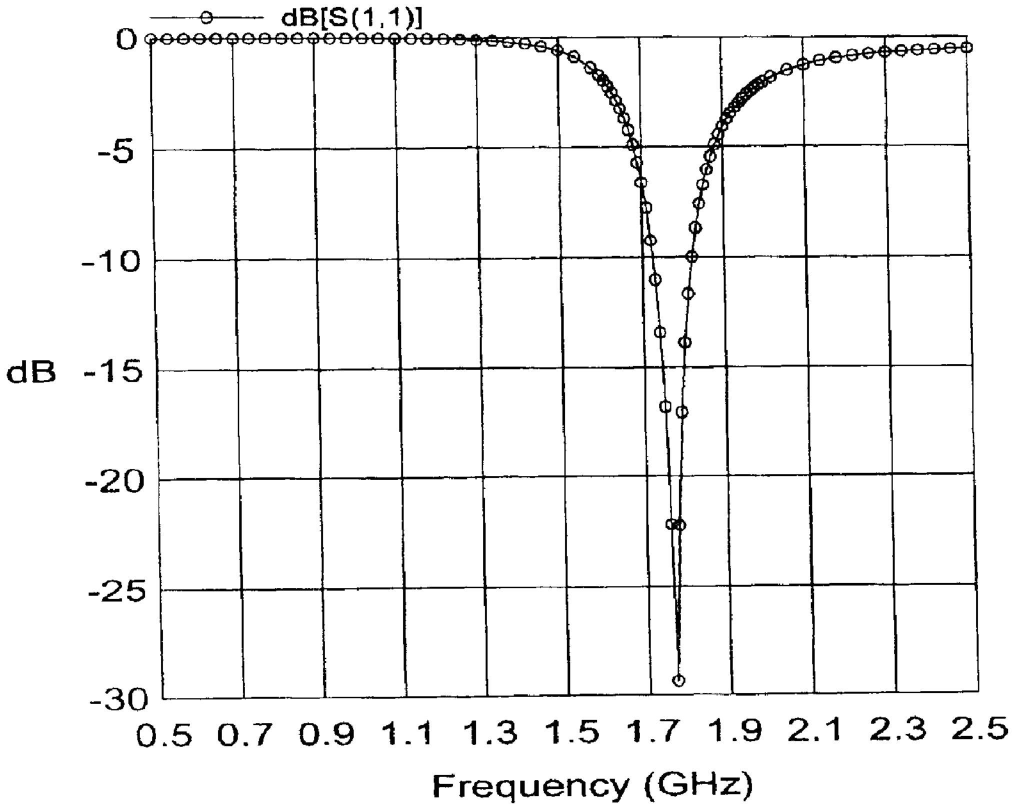
FIG. 9 shows the frequency response for the second arrangement shown in FIG. 5.

FIG. 8 shows the Smith chart for the second arrangement described above in relation to FIG. 5, while FIG. 9 illustrates the frequency response of the arrangement, showing a resonant frequency at 1.85 GHz, so that the antenna is suitable for use at the GSM 1800 MHz and 1900 MHz bands.

Figure 10:
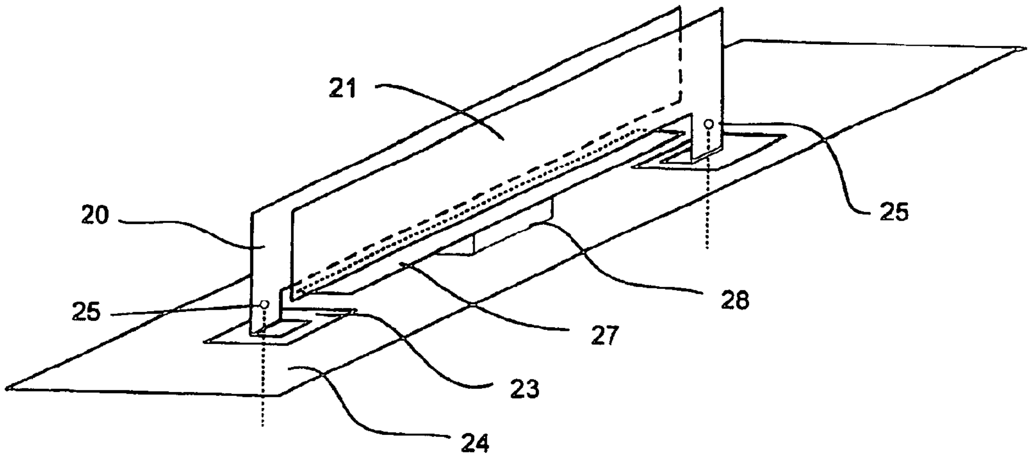
FIG. 10 shows a further embodiment of the invention including a floating ground.

FIG. 10 shows a balanced antenna as described above in relation to FIG. 4, with the addition of a floating ground 27. The floating ground 27 is an area of conductive material made of same material as the balanced antenna. The floating ground 27 is disposed between the antenna elements 20,21 and the PCB 24, for example 1 mm from the bottom of the antenna elements 20,21 and 2 mm from the PCB 24. The length of the floating ground is made approximately 2 mm shorter than the antenna elements 20,21. The floating ground 27 is supported on an area of dielectric-like plastic 28 which is used in the MID technique and has no electrical connections to the ground plane 24 or the antenna plates 20, 21. Since the fields emitted from the two parts 20, 21 of the balanced antenna are identical in magnitude and opposite in phase, the floating ground has the properties of an electrical ground.

Figure 11A:
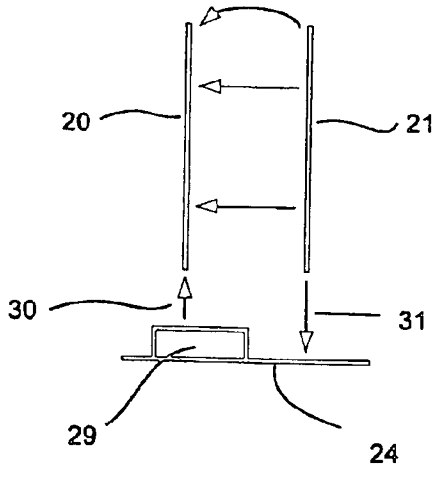
FIG. 11*a* illustrates the electric fields generated by a balanced antenna in the absence of a floating ground.
Figure 11B:
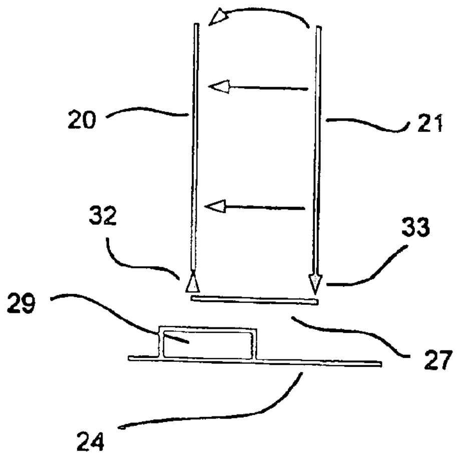
FIG. 11*b* illustrates the electric field generated by a balanced antenna in the presence of a floating ground.

The purpose of the floating ground is illustrated in FIGS. 11*a* and 11*b*. FIG. 11*a* shows the electric field generated when the antenna is in use between the first and second antenna elements 20, 21, the PCB 24 and a component 29 mounted to the PCB 24. The electric field 30 between the first antenna element 20 and the PCB 24 is altered by the presence of the component 29, by comparison with the field 31 between the second antenna plate 21 and the PCB 24. The effect of the position of the first element 20 of the balanced antenna 7 over the component 29 is to lower the impedance to ground for the first antenna element 20, which can significantly after antenna behavior.

FIG. 11*b* illustrates the effect of introducing a floating ground 27. The electric fields 32, 33 between each of the antenna elements 20, 21 and the floating ground 27 are unaffected by the presence of the component 29 on the PCB. The use of a floating ground 27 therefore makes the PCB area under the antenna 7 available for mounting electrical components. The components will not affect antenna operation and their operation will m turn be unaffected by the antenna field.

Figure 12:
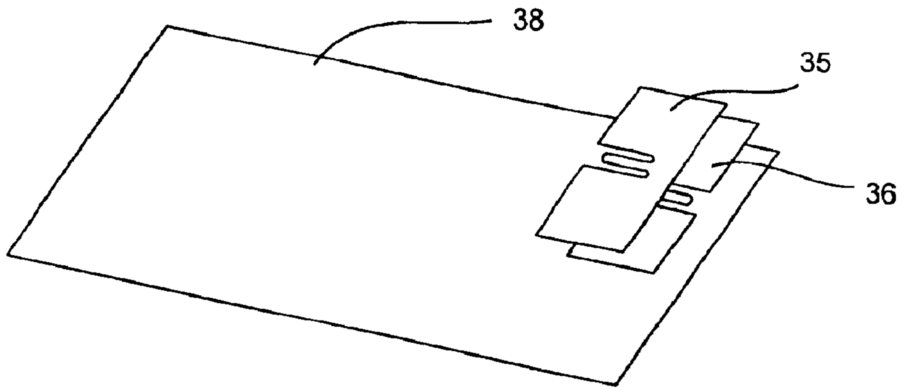
FIG. 12 is a perspective view showing a further example of a balanced antenna comprising two opposed elements.
Figure 13:
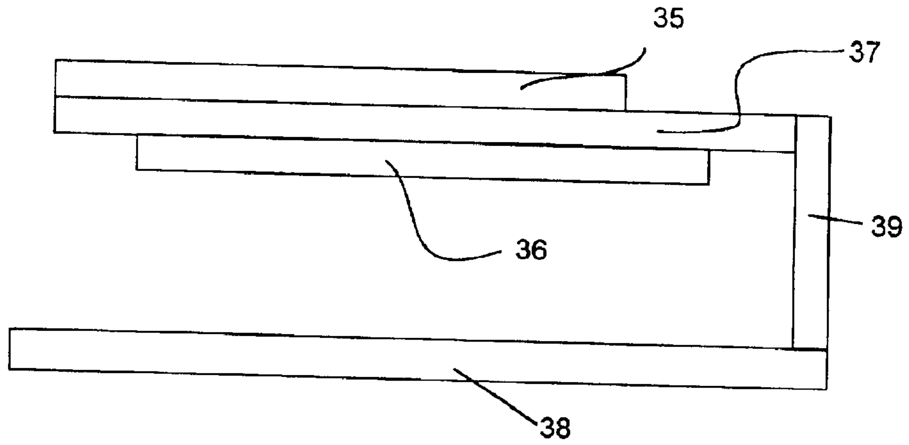
FIG. 13 is a side view of the antenna of FIG. 12, showing the various layers.

FIGS. 12 and 13 show a further embodiment of a balanced antenna. The antenna comprises first and second substantially identical conductive elements 35, 36 disposed on either side of a 1 mm thick dielectric layer 37, comprising a material with a high dielectric constant, for example greater than 8, such as ceramic materials. The dielectric layer 37, shown in FIG. 13 only for clarity, is spaced 3 mm above a ground plane 38, for example the PCB to which the handset components are mounted. The dielectric layer 37 is connected to a non-conductive leg 39 which extends down to the PCB and so supports the antenna structure above the ground plane 38. The conductive elements 35, 36, dielectric layer 37 and ground plane 38 are substantially parallel with respect to one another.

Figure 14:
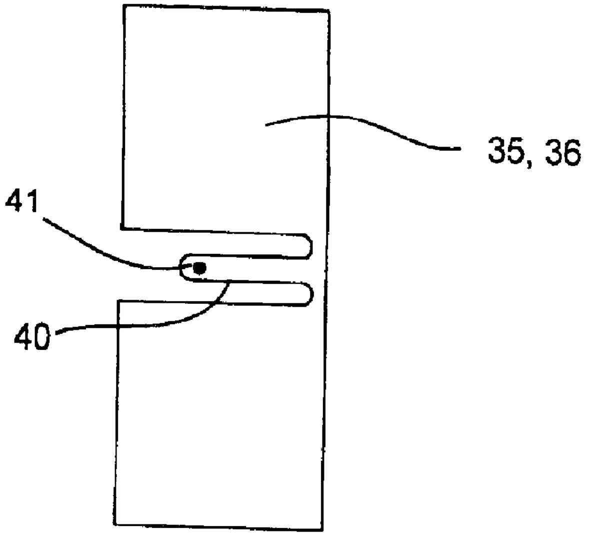
FIG. 14 is a detailed view of one of the elements shown in FIG. 12.
Figure 15:
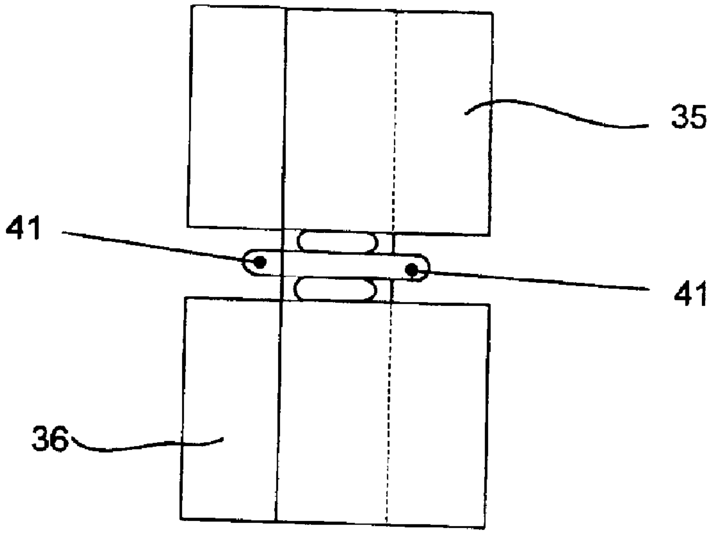
FIG. 15 is a top view of the antenna of FIG. 12, showing the arrangement of the elements.

As shown in FIG. 14, each element 35, 36 comprises a central spur 40 3 mm long and 1 mm wide connected on either side, at one end, to substantially identical panels 5.5 mm long by 5.1 mm wide. Overall, each element 35, 36 is substantially rectangular, 14 mm long by 5.1 mm wide and has a feed point 41 at the free end of the spur 40. As shown in FIG. 15, the elements 35, 36 are arranged overlapping and opposite one another, one element 35 being reversed with respect to the other 36 so that the feed points 41 are at opposite ends of the antenna arrangement.

The antenna described above in relation to FIGS. 12 to 15 has similar properties to the balanced antenna shown in FIGS. 4 and 5, in terms of its easy interfacing to a balanced power amplifier stage without a lossy conversion network and the fact that antenna induced currents in the ground plane of the PCB are relatively small. It can be shown that there is some current on the PCB but it is fairly independent of the PCB position, both in terms of height and orientation. For example, turning the antenna by 90° would turn the radiation pattern by 90°. However, dipole operation is not obtained no matter how the radiating elements are positioned with respect to one another.

Figure 16:
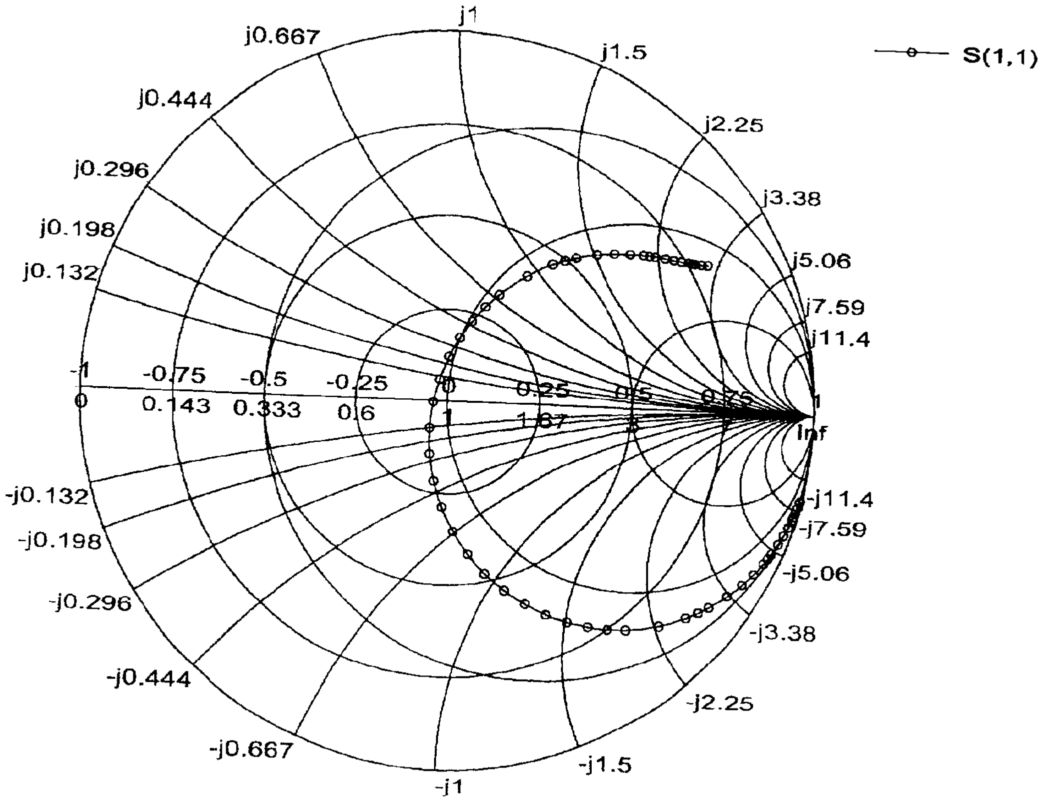
FIG. 16 is a Smith chart for the antenna of FIG. 12.
Figure 17:
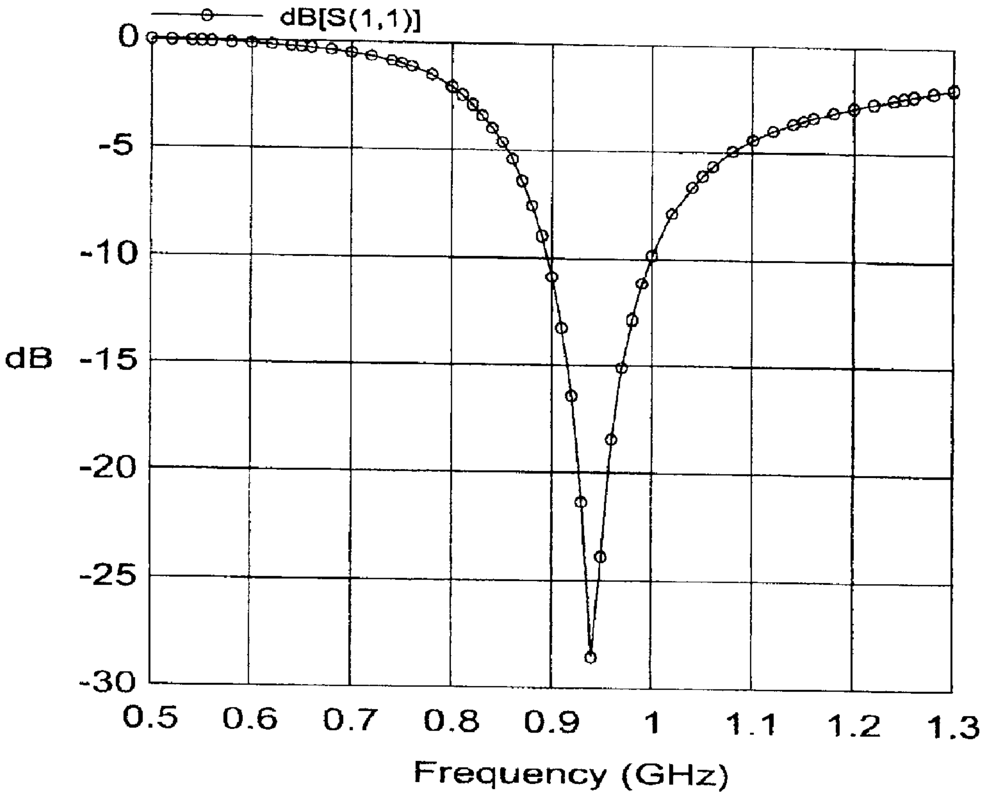
FIG. 17 shows the frequency response of the antenna of FIG. 12.

FIG. 16 is a Smith chart of the impedance at the balanced input. This shows the low impedance nature of the input. FIG. 17 shows the frequency response of this antenna arrangement. The antenna has a resonant frequency at 0.94 GHz, where it has a real impedance of 7.4 ohms.

It will be understood that while the antenna arrangement has been described with detailed dimensions and relative arrangement of conductive plates, this is merely a specific example of the invention, and modifications to the dimensions and precise arrangement of the components which do not alter the principles of operation also fall within the scope of this invention.

What is claimed is:

1. A balanced antenna for connecting to a balanced power amplifier stage in a portable communications device, the balanced power amplifier stage including first and second outputs, the antenna comprising a ground plane and first and second antenna elements spaced apart from the ground plane, wherein the first antenna element has a face lying in a first antenna plane and a second antenna element has a face lying in a second antenna plane, the faces are substantially parallel and spaced apart from each other in a direction perpendicular to one of the first and second antenna planes, and wherein each of the antenna elements has a feed point connectable to a different output from the power amplifier stage.

2. A balanced antenna according to claim 1, wherein the antenna elements are substantially identical, each of the antenna elements having an orientation direction, defined from the feed point to an end opposite the feed point, and the orientation directions of the first and second antenna elements are reversed with respect to one another.

3. A balanced antenna according to claim 1, wherein the feed points of the antenna elements are arranged at opposite sides of the antenna arrangement.

4. A balanced antenna according to claim 1, wherein the first and second antenna elements comprise conductive plates.

5. A balanced antenna according to claim 1, wherein the portable communications device includes a printed circuit board and the ground plane comprises the printed circuit board.

6. A balanced antenna according to claim 1, wherein the faces are substantially perpendicular to the ground plane.

7. A balanced antenna according to claim 1, wherein the space between the antenna elements comprises air.

8. A balanced antenna according to claim 1, wherein the faces are substantially parallel to the ground plane.

9. A balanced antenna according to claim 8, wherein the space between the antenna elements comprises a dielectric material.

10. A balanced antenna according to claim 9, wherein the dielectric material has a high dielectric constant.

11. A balanced antenna according to claim 10, wherein the dielectric constant is greater than about 8.

12. A balanced antenna according to claim 1, further comprising a floating ground between the ground plane and the antenna elements.

13. A balanced antenna according to claim 12, wherein the floating ground comprises a conductive plate which is electrically isolated from the ground plane.

14. A balanced antenna according to claim 13, wherein the conductive plate is spaced apart from the ground plane by a dielectric support.

15. A mobile telephone including a balanced antenna according to claim 1.

16. A portable communications device comprising a circuit board including a plurality of electronic components mounted thereon and a balanced antenna, the balanced antenna comprising first and second antenna elements mounted to the board, wherein the first antenna element has a face lying in a first antenna ilane and the second antenna element has a face lying in a second antenna plane and the faces are substantially parallel and spaced apart from each other in a direction perpendicular to one of the first and second antenna planes, each of the antenna elements having a top edge and a bottom edge, the bottom edge being nearer the board than the top edge, the device further comprising a ground plane disposed between the bottom edge of the antenna elements and the board, the ground plane being electrically isolated from the antenna elements and the board, and each of the antenna elements having a different feed point.

17. A balanced antenna for a portable communications device, comprising a ground plane and first and second substantially similar antenna elements spaced apart from each other and from the ground plane, the first antenna element having a face lying in a first antenna plane and the second antenna element having a face lying in a second antenna plane, wherein the faces and the ground plane are substantially parallel and spaced apart from each other in a direction perpendicular to one of the first and second antenna planes, the first and second antenna elements are aligned in opposite directions with respect to one another and each of the antenna elements has a different feed point.

18. A method of manufacturing a balanced antenna for connecting to a balanced power amplifier stage in a portable communications device, the balanced power amplifier stage including first and second outputs, the antenna comprising a ground plane and first and second antenna elements, the first antenna element having a face lying in a first antenna plane and the second antenna element having a face lying in a antenna planes, wherein the faces are spaced apart from each other in a direction perpendicular to one of the first and second antenna planes and from the ground plane, wherein the antenna elements are arranged to be opposite one another and to overlap to a predetermined extent, and each of the antenna elements has a feed point connectable to a different output from the balanced power amplifier stage, the method comprising varying the extent to which the antenna elements overlap to tune the antenna for use in a predetermined frequency band.

* * * * *